United States Patent
Watanabe et al.

(10) Patent No.: US 8,379,306 B2
(45) Date of Patent: Feb. 19, 2013

(54) MAGNIFICATION-VARYING OPTICAL DEVICE

(75) Inventors: Naomi Watanabe, Saitama (JP); Kazuya Miyaji, Saitama (JP)

(73) Assignee: Kamakura Koki Co., Ltd., Saitama (JP)

( * ) Notice: Subject to any disclaimer, the term of this patent is extended or adjusted under 35 U.S.C. 154(b) by 648 days.

(21) Appl. No.: 12/556,491

(22) Filed: Sep. 9, 2009

(65) Prior Publication Data

US 2010/0073774 A1    Mar. 25, 2010

(30) Foreign Application Priority Data

Sep. 19, 2008  (JP) ................................. 2008-241037

(51) Int. Cl.
  *G02B 23/00*  (2006.01)
(52) U.S. Cl. ........ 359/407; 359/418; 359/422; 359/672; 359/702
(58) Field of Classification Search .................. 359/407, 359/421, 422, 676, 418, 672–675, 694, 702
See application file for complete search history.

(56) References Cited

U.S. PATENT DOCUMENTS

| | | | |
|---|---|---|---|
| 1,127,720 A | | 2/1915 | Baille-Lemaire |
| 1,553,211 A | | 9/1925 | Barr et al. |
| 2,985,070 A | | 5/1961 | Lane |
| 3,437,397 A | * | 4/1969 | Humphrey .................... 359/556 |
| 4,715,692 A | * | 12/1987 | Yamada et al. ................ 359/674 |
| 4,965,615 A | * | 10/1990 | Fujita et al. .................... 396/83 |
| 5,000,556 A | * | 3/1991 | Katsuma ........................ 359/407 |
| 5,500,769 A | * | 3/1996 | Betensky ....................... 359/676 |
| 5,576,892 A | * | 11/1996 | Hotta et al. .................... 359/696 |
| 6,088,156 A | * | 7/2000 | Kato ............................... 359/422 |
| 6,167,201 A | * | 12/2000 | Hara et al. ....................... 396/77 |
| 6,493,153 B2 | * | 12/2002 | Funatsu ......................... 359/694 |
| 2008/0316613 A1 | * | 12/2008 | Sakai ............................. 359/672 |
| 2009/0073572 A1 | * | 3/2009 | Atsuumi ........................ 359/672 |

FOREIGN PATENT DOCUMENTS

| | | |
|---|---|---|
| GB | 504032 | 4/1939 |
| JP | 10246858 | 9/1998 |
| JP | 2000-010025 A | 1/2000 |
| JP | 2001305434 A | * 10/2001 |

OTHER PUBLICATIONS

European Search Report (3 pages, Oct. 16, 2009).
State Intellectual Property Office (SIPO) of China, Official Action dated Nov. 1, 2012 for Chinese application No. 200910172112.4 (Chinese counterpart of U.S. Appl. No. 12/556,491).

* cited by examiner

*Primary Examiner* — Frank Font
(74) *Attorney, Agent, or Firm* — The Maxham Firm

(57) ABSTRACT

The invention relates to improving optical properties of optical instruments with variable magnification, such as zoom binoculars, reducing the weight thereof, and enabling the user to change magnifications quickly. The invention provides an optical instrument with a focal length-varying lens 4 disposed on the optical axis between an objective lens 7 and an eyepiece 3, further having an adjusting lens 5 for adjusting optical properties when the focal length-varying lens is in an area to provide high magnification. The adjusting lens is supported so that it is capable of moving between a location on the optical axis and a location off the path of light beams. Interlocked with a magnification-varying mechanism that controls the position of the focal length-varying lens, the adjusting lens is moved to the on-the-axis location when the focal length-varying lens is in an area to provide high magnification, and to the off-the-axis location when low magnification.

13 Claims, 4 Drawing Sheets

MAGNIFICATION-VARYING OPTICAL DEVICE

TECHNICAL FIELD

The present invention relates to a magnification-varying optical device applicable to so-called zoom binoculars or field spotting scopes.

BACKGROUND ART

Binoculars, as an example of optical instruments, are classified into binoculars with fixed magnification and binoculars with variable magnification or so-called zoom binoculars.

Zoom binoculars are equipped with many lenses, compared with fixed magnification scopes, so as to have good optical performance irrespective of their varied magnifications, as disclosed in Patent Document 1. Also, zoom binoculars are provided with complicated mechanisms for moving lenses to vary the magnification without changing their focal point.

Patent Document 1: JP H10-246858 A

DISCLOSURE OF THE INVENTION

Such conventional zoom binoculars are often inferior in optical performance due to their structures. Specifically, they are apt to have darker images and smaller visual fields than scopes with a fixed magnification, or they are not able to produce clear images due to insufficient correction of optical aberration.

Zoom binoculars are often used at an extreme magnification, or either of the maximum magnification and the minimum magnification. However, the complicated mechanism for moving lenses prohibits quick zooming operation between the extreme magnifications, which makes operability poor.

Besides, zoom binoculars require a number of lenses and complicated mechanisms for moving lenses, which makes resultant products more expensive and heavier than fixed magnification binoculars. It is also difficult to place binoculars with a large objective aperture, which has excellent optical performance, into practical use.

MEANS TO SOLVE THE PROBLEMS

The first means to solve the aforementioned problems is a magnification-varying optical device comprising an objective lens, an eyepiece, and a focal length-varying lens placed between the objective lens and the eyepiece on an optical axis passing through the objective lens and the eyepiece, the focal length-varying lens capable of moving along the optical axis, the device further comprising:

an adjusting lens for adjusting optical properties when the focal length-varying lens is in an area to provide a magnification within a predetermined range;

an adjusting lens-supporting mechanism for moving the adjusting lens between a first location on the optical axis and a second location off the optical axis, and non-movably holding the adjusting lens at either of the first location and the second location; and an interlocking mechanism for interlocking the adjusting lens-supporting mechanism with a magnification-varying mechanism for adjusting a location of the focal length-varying lens, wherein the interlocking mechanism moves the adjusting lens-supporting mechanism so that the adjusting lens is on the optical axis when the focal length-varying lens is in the area to provide a magnification within the predetermined range, and the adjusting lens is off the optical axis when the focal length-varying lens is in an area to provide a magnification outside the predetermined range.

The second means is the magnification-varying optical device according to the first means, wherein the adjusting lens-supporting mechanism comprises:

an adjusting lens-supporting shaft disposed parallel with the optical axis and at a location that does not interfere with an optical path;

an adjusting lens frame for holding the adjusting lens, the adjusting lens frame being supported by the adjusting lens-supporting shaft so as to be capable of turning around the adjusting lens-supporting shaft, whereby the adjusting lens is turned to the first location or the second location; and a spring for applying force to the adjusting lens frame so as to urge the adjusting lens frame to the first location or the second location.

The third means is the magnification-varying optical device according to the second means, wherein the magnification-varying mechanism comprises a rotating tube rotatable around the eyepiece and non-movable along an axis thereof, and a cam system for converting rotational motion of the rotating tube to linear motion and for transmitting the linear motion to the focal length-varying lens; and the interlocking mechanism is configured so as to move the adjusting lens frame to the first location or the second location depending on the rotating direction of the rotating tube.

The fourth means is the magnification-varying optical device according to any one of the first to the third means, wherein the adjusting lens is a concave lens for lengthening a focal length of the objective lens, and the interlocking mechanism is configured so as to place the adjusting lens on the optical axis only when the focal length-varying lens is in the area to provide a magnification within the predetermined range.

The fifth means is the magnification-varying optical device according to any one of the first to fourth means, wherein the magnification-varying optical device is applied to a pair of binoculars equipped with a pair of optical systems for the left eye and the right eye, each optical system comprising a prism inserted between the objective lens and the eyepiece.

ADVANTAGES OF THE INVENTION

According to each of the inventions described in the first means and its following means, the adjusting lens is on the optical axis only when the magnification is in a predetermined range and it is in an off-the-optical-axis turnout when the magnification is outside the predetermined range, which optimizes the optical properties of the lenses depending on the magnification by the employment or the non-employment of the adjusting lens. Therefore compared with the conventional zoom binoculars which always use the same lenses and vary the magnification by moving the same lenses, the optical device of the present invention, equipped with a smaller number of lenses, is capable of providing a wide variety of magnification while keeping good optical properties.

The present invention does not require complicated movements of lenses to vary the magnification and simplifies the structural configuration of the magnification-varying mechanism, which enables the user to quickly change the magnification. The simple power-varying structure and the smaller number of lenses, in turn, reduce the cost for production and the weight thereof. These advantages lead to realization of larger zoom binoculars, for example those with a large objective aperture, in practical use.

BEST MODE TO CARRY OUT THE INVENTION

We will explain a pair of zoom binoculars, an example in which the magnification-varying optical device according to the present invention is embodied, referring to the attached figures.

Figure 1:
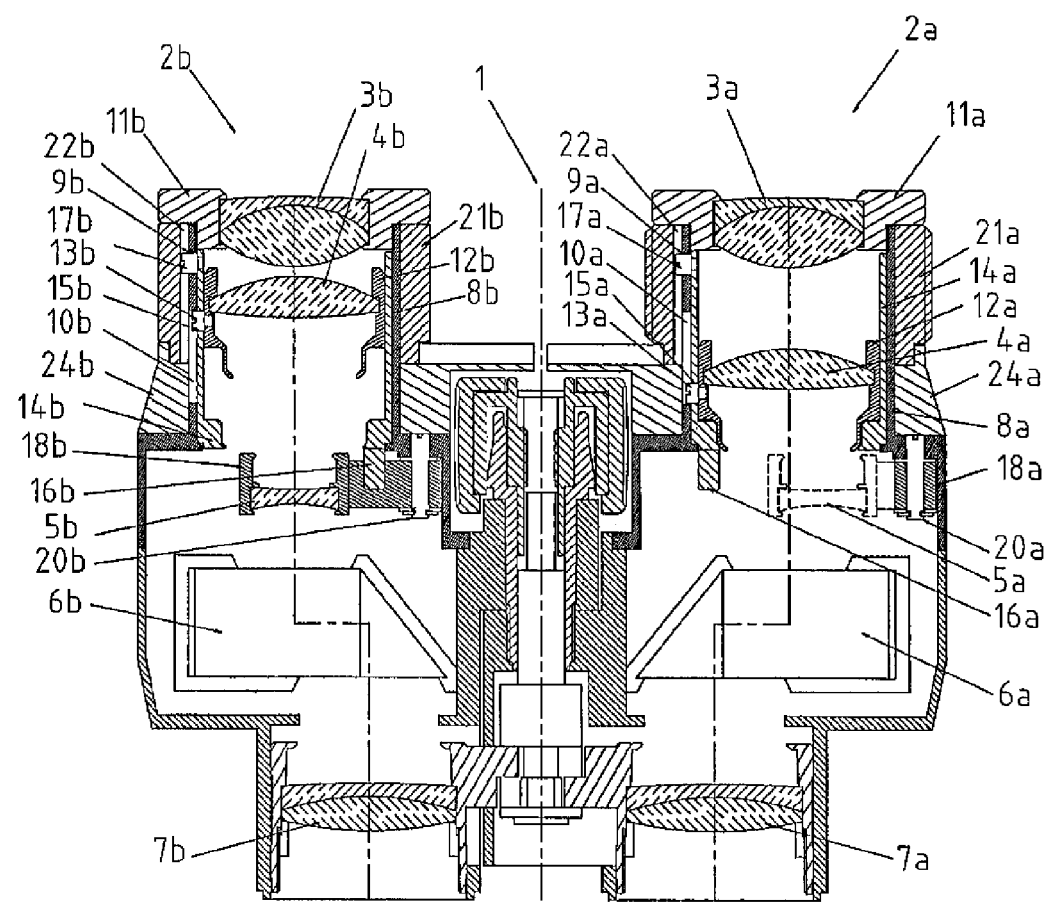
FIG. 1 is a longitudinal sectional view of an embodiment in which a magnification-varying optical device according to the present invention is applied to a pair of binoculars.

FIG. 1 is a longitudinal sectional view of the pair of binoculars. Note that this figure is a sectional view to illustrate the present invention and it is not a view taken upon a single plane. The view of this figure has not only sections including optical axes and a central axis but also sections appropriate to showing principal parts of the binoculars.

In FIG. 1, reference numeral 1 denotes a central axis of the binoculars, 2a a right barrel for the right eye of a user, and 2b a left barrel for the left eye of the user. The right barrel shown in the figure is that in a state where the magnification is low, and the left barrel shown is that in a state where the magnification is high. In the figures other than FIG. 1 and the following description, members associated with the right barrel 2a have an enclitic "a" that is added to their reference numerals, and members associated with the left barrel 2b have an enclitic "b" added to their reference numerals.

<Basic Structure>

A basic structure of these binoculars will be explained first. These binoculars receive light including information about an image through objective lenses 7a, 7b respectively disposed at the object side of the barrels 2a, 2b, invert the image to an erecting image with prisms 6a, 6b, which are typically Porro prisms, and send it to eyepieces 3a, 3b to project it on an imaging surface. Each of the objective lenses 7a, 7b and the eyepieces 3a, 3b is a convex lens having two lenses stuck to each other. Focusing is carried out by moving the objective lenses 7a, 7b along their optical axes. The focusing device employed in this example enables the user to move the right objective lens 7a and the left objective lens 7b simultaneously with a central focusing wheel disposed on the central axis 1, via which the right barrel 2a is coupled with the left barrel 2b. The focusing device, employing the so-called central focusing mechanism, may be a conventional one. Also, the coupling of the right barrel 2a with the left barrel 2b so that they are able to turn around the central axis 1 to enable the user to adjust the pupil distance to his or hers is conventionally known. We omit a detailed explanation of these mechanisms, because they are essentially the same as conventional ones and not features of the present invention.

Focal length-varying lenses 4a, 4b, each of which is a convex lens, are disposed between the prisms 6a, 6b and the eyepieces 3a, 3b, respectively, so that the focal length-varying lenses are movable along the respective optical axes. Adjustment of the distances between the focal length-varying lenses 4a, 4b and the eyepieces 3a, 3b through the magnification-varying mechanisms, which are operated by the user, changes the focal lengths on the eyepiece side, whereby a basic magnification-varying operation, i.e. zooming, is carried out.

Adjusting lenses 5a, 5b are placed between the focal length-varying lenses 4a, 4b and the prisms 6a, 6b, respectively. These adjusting lenses 5a, 5b are supported by the adjusting lens-supporting mechanisms so that the adjusting lenses move across the respective optical axes and occupy a location where the optical axes of the adjusting lenses are on the optical axes along which light beams through the objective lenses 7a, 7b come and pass through the focal length-varying lenses 4a, 4b, which location will be called "on-the-axis location" hereinafter, and a location where the adjusting lenses do not interfere in the paths of the light beams, which location will be called "off-the-axis location" hereinafter. In this example in which the adjusting lenses 5a, 5b are concave lenses, the adjusting lenses 5a, 5b occupy the on-the-axis location when the focal length-varying lenses 4a, 4b are located at predetermined positions where the binoculars provide a predetermined range of high magnifications, for example, in the left barrel 2b in FIG. 1, at a position in proximity of the eyepiece 3b, which shortens the focal length on the eyepiece side. The adjusting lenses occupy the off-the-axis location when the focal length-varying lenses are located at positions other than the above, where the binoculars provide lower magnifications. This arrangement makes it possible to lengthen the focal lengths on the objective-lens side and provide a large range of variation of the magnification, or a large zoom ratio without relying only on the focal length-varying lenses 4a, 4b.

We will explain details of each mechanism to operate it in the manner described above in the following.

We will explain the magnification-varying mechanisms to move the focal length-varying lenses 4a, 4b. The magnification-varying mechanism serves to convert rotational motion of a rotating tubes 21a, 21b provided by the user, to linear motion and to transmit the linear motion to each of the focal length-varying lenses 4a, 4b. Various mechanisms of converting rotational motion to linear motion are known. In this example is employed a cam system having a pin engaged with an elongated hole.

Each of the magnification-varying mechanisms is mainly composed of an ocular tube 8a (or 8b), the rotating tube 21a (or 21b) rotatably fixed on an outer circumference of the ocular tube, a cam tube 14a (or 14b) rotatably fixed on an inner circumference of the ocular tube 8a (or 8b), and a focal length-varying lens frame 12a (or 12b) fixed on an inner circumference of the cam tube 14a (or 14b) so that the focal length-varying lens frame is capable of rotating and sliding along the axis.

An eyepiece frame 11a (or 11b) that holds an eyepiece 3a (or 3b) is screwed into the free end of the ocular tube 8a (or 8b). The rotating tube 21a (or 21b) is tightly held between the eyepiece frame 11a (or 11b) and a planar belt guide 24a (or 24b) attached to the base of the ocular tube 8a (or 8b). The rotating tube 21a (or 21b) is thus rotatably held, while its movement along the axis is prevented.

Figure 2:
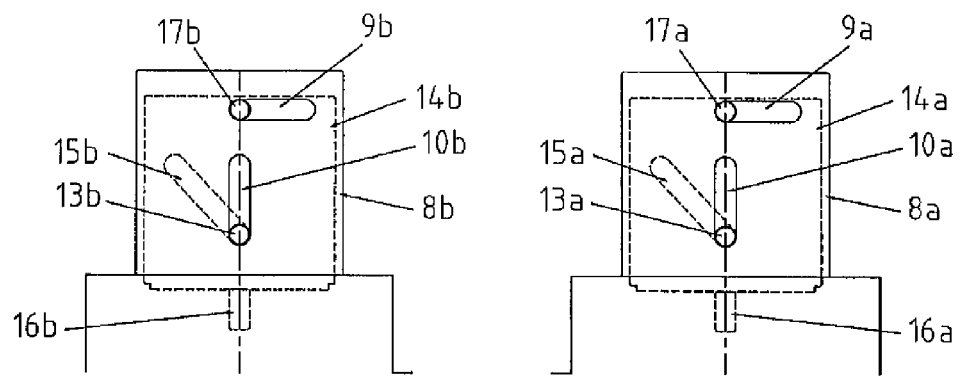
FIG. 2 is an illustration showing the magnification-varying mechanisms of the embodiment shown in FIG. 1.

As shown in FIG. 2, the ocular tube 8a (or 8b) has a lateral hole 9a (or 9b) formed therein, which is an elongated arc hole extending along the circumference of the tube in proximity of the free end of the tube, which free end is close to the eyepiece 3a (or 3b). The ocular tube also has a longitudinal hole 10a (or 10b) formed therein, which is an elongated hole extending along the axis at a middle part of the ocular tube, with the upper end of the longitudinal hole located a little below the lateral hole. The longitudinal hole 10a (or 10b) has a length which is the same as the distance that the focal length-varying lens 4a (or 4b) moves.

In the cam tube 14a (or 14b) is formed a cam hole 15a (or 15b) which is an inclined elongated hole, extending the same length along the axis as the longitudinal hole 10a (or 10b), at the same location as the longitudinal hole along the axis of the tubes. Also, the cam hole 15a (or 15b) extends the same length along the circumference of the cam tube as the lateral hole 9a (or 9b).

A cam tube-guiding pin 17a (or 17b) that engages with the lateral hole 9a (or 9b) is fixed at an upper part of the outer circumference of the cam tube 14a (or 14b). The cam tube-guiding pin 17a (or 17b) passes through the lateral hole 9a (or 9b) and further engages with an inner longitudinal groove 22a (or 22b) that is formed along the axis in the inner circumference of the rotating tube 21a (or 21b). Thus, the rotating tube 21a (or 21b) is capable of turning on the ocular tube 8a (or 8b) by the angle corresponding to the circumferential length determined by the lateral hole 9a (or 9b). The turning of the rotating tube is transmitted to the cam tube 14a (or 14b).

A focal length-varying lens frame-guiding pin 13a (or 13b) is fixed on an outer circumference of the focal length-varying lens frame 12a (or 12b). The focal length-varying lens frame-guiding pin 13a (or 13b) passes through the cam hole 15a (or 15b) of the cam tube 14a (or 14b) and engages with the longitudinal hole 10a (or 10b) of the ocular tube 8a (or 8b).

FIG. 2 shows the state where the rotating tube 21a (or 21b) shown in FIG. 1 is turned clockwise, viewed from the side of the eyepieces, to a stop which is determined by the engagement between the cam tube-guiding pin 17a (or 17b) and the lateral hole 9a (or 9b). In this state, the focal length-varying lens frame-guiding pin 13a (or 13b) comes at the objective lens-side ends of the longitudinal hole 10a (or 10b) and the cam hole 15a (or 15b). When the device is in this state, the focal length-varying lens 4a (or 4b) is at the position where the binoculars provide the minimum magnification.

When the rotating tube 21a (or 21b) is turned counterclockwise from this state, the focal length-varying lens frame-guiding pin 13a (or 13b) receives thrust working along the axis to move the pin toward the eyepiece 3a (or 3b), due to the engagement of the pin with the inclined cam hole 15a (or 15b) and the corresponding rotation of the cam tube 14a (or 14b). Receiving the thrust, the focal length-varying lens frame-guiding pin 13a (or 13b) moves the focal length-varying lens 4a (or 4b) along the longitudinal hole 10a (or 10b) in the direction of the eyepiece, which increases the magnification.

In the state where the rotating tube 21a (or 21b) is turned counterclockwise to a stop which, is determined by the engagement between the cam tube-guiding pin 17a (or 17b) and the lateral hole 9a (or 9b), the focal length-varying lens frame-guiding pin 13a (or 13b) comes at the eyepiece-side ends of the longitudinal hole 10a (or 10b) and the cam hole 15a (or 15b). When the device is in this state, the focal length-varying lens 4a (or 4b) is at the position where the binoculars provide the maximum magnification.

When the rotating tube 21a (or 21b) is turned clockwise from this state that provides the maximum magnification, the focal length-varying lens 4a (or 4b), receiving a force working in the opposite direction, moves accordingly to decrease the magnification. Operating the rotating tube 21a (or 21b) an these manners realizes continuous movement of the focal length-varying lens 4a (or 4b) from the position where the binoculars provides the minimum magnification to the position where they provides the maximum magnification.

Figure 3:
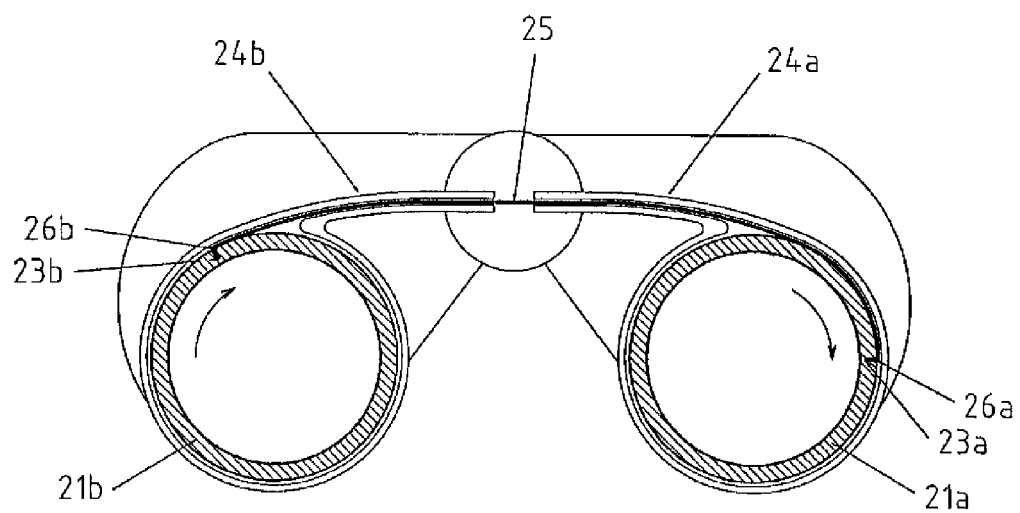
FIG. 3 is a transverse sectional view showing the first state of the rotating tubes in the embodiment of FIG. 1.
Figure 4:
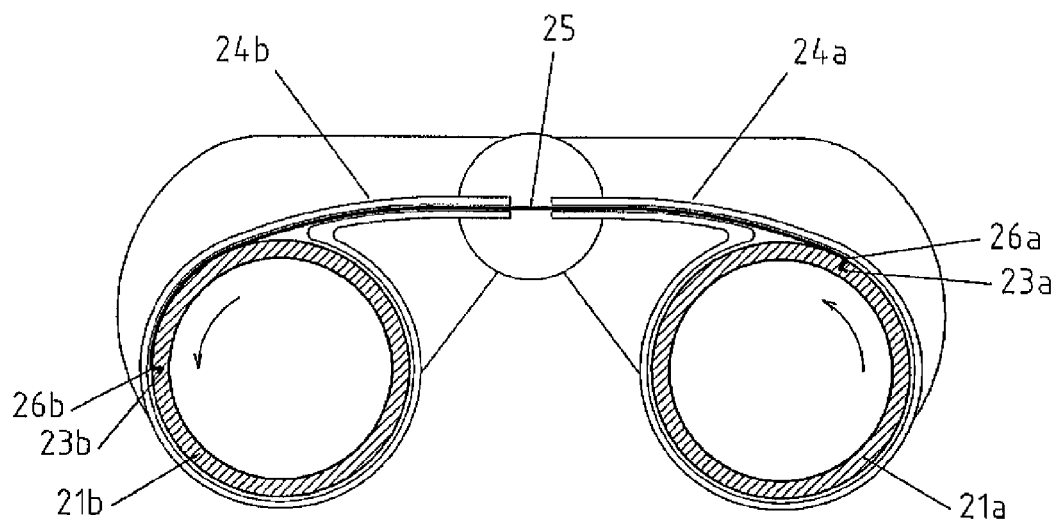
FIG. 4 is a transverse sectional view showing the second state of the rotating tubes in the embodiment of FIG. 1.

FIGS. 3 and 4 show an example of the structure to link the left magnification-varying mechanism and the right magnification-varying mechanism. Click-receiving grooves 23a, 23b extending along the axis are formed in the outer circumferential faces of the rotating tubes 21a, 21b. The click-receiving grooves 23a, 23b receive and engage with a right click 26a and a left click 26b with which a planar belt 25 is provided at both ends thereof. The planar belt 25 is made of a flexible material, such as spring steel, in the shape of a plate. The planar belt 25 is housed in a first elongated hole formed in the planar belt guide 24a and a second elongated hole formed in the planar belt guide 24b. The first elongated hole extends generally along a first tangent line of the right rotating tube 21a, and the second elongated hole extends generally along a second tangent line of the left rotating tube 21b, wherein the second tangent line is aligned with the first tangent line so that the first and second elongated holes are aligned so as to form an almost continuous elongated housing that extends over the right barrel 2a and the left barrel 2b. The planar belt 25 transmits a rotation of the right rotating tube 21a to the left rotating tube 21b and vice versa, through one-way and the opposite-way movements thereof. Thus an operation of one rotating tube 21a simultaneously actuates the other rotating tube 21b, whereby the respective magnification-varying mechanisms of the rotating tubes provide a same magnification.

<Details of the Adjusting Lens-Supporting Mechanisms>

We are moving on explaining the adjusting lens-supporting mechanisms. As shown in FIG. 1, each of the adjusting lens-supporting mechanisms mainly has an adjusting lens-supporting shaft 20a (or 20b); an adjusting lens frame 18a (or 18b) which holds the adjusting lens 5a (or 5b) while the adjusting lens frame is supported by the adjusting lens-supporting shaft 20a so that the adjusting lens frame turns around the shaft and moves the adjusting lens 5a (or 5b) to the on-the-axis location or to the off-the-axis location; and a spring for urging the adjusting lens frame 18a (or 18b) to either the on-the-axis location or the off-the-axis location.

Figure 5:
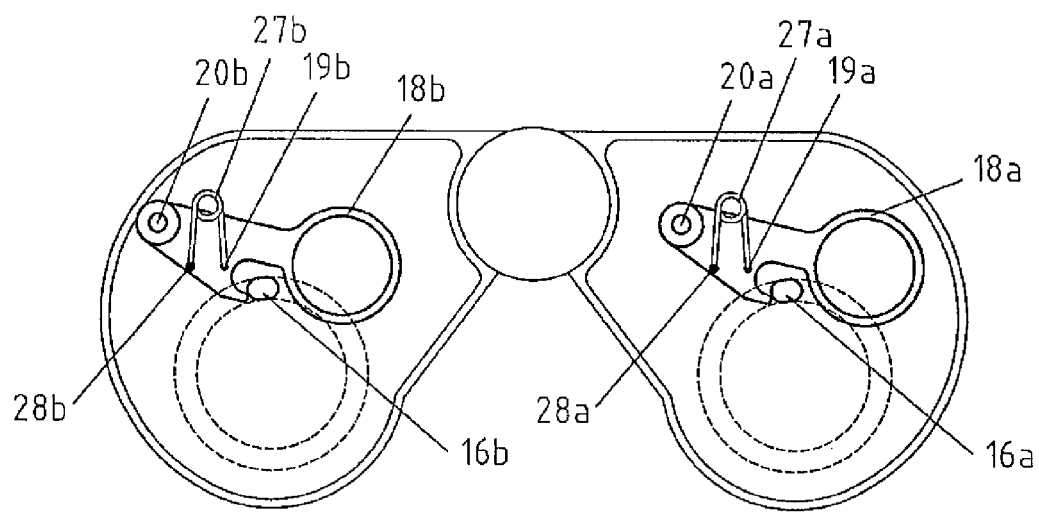
FIG. 5 is a transverse cross section showing the adjusting lenses at the second location.
Figure 6:
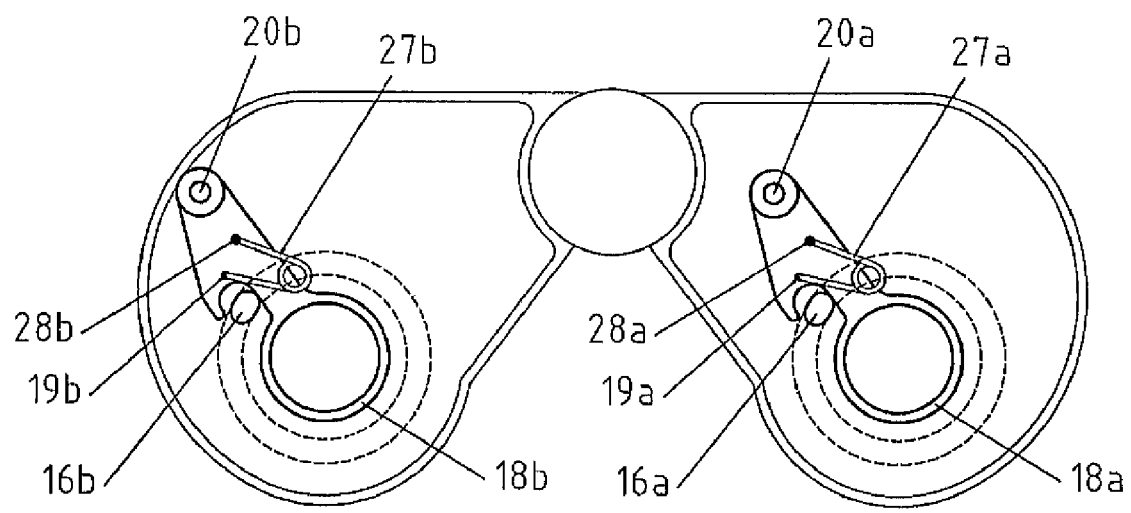
FIG. 6 is a transverse cross section showing the adjusting lenses at the first location.

FIGS. 5 and 6 show the adjusting lens-supporting mechanisms viewed from the side of the eyepieces. Specifically, FIG. 5 shows them in the state where the adjusting lenses 5a, 5b occupy the off-the-axis locations, while FIG. 6 shows them in the state where the adjusting lenses occupy the on-the-axis locations. The adjusting lens frames 18a, 18b are prevented from slipping off the respective shafts with retainers, whereby the adjusting lens frames do not move along the adjusting lens-supporting shafts 20a, 20b but just turn around the shafts. The turning movement is limited between the off-the-axis locations where the adjusting lenses 5a, 5b do not interfere in the paths of the light beams (as shown in FIG. 5) and the on-the-axis locations where the optical axes of the adjusting lenses are on the axes of the light beams (as shown in FIG. 6). Each of the springs exerts force to the adjusting lens 5a (or 5b) so as to urge the adjusting lens to either of the two locations selectively.

An example of the spring is a so-called torsion spring 27a (or 27b) having a coil with its ends extended to form arms, as shown in FIGS. 5 and 6. The end of one of the arms is fixed in a fixing hole 28a (or 28b) formed in the barrel 2a (or 2b), and the end of the other arm is fixed in a hole 19a (or 19b) formed in the adjusting lens frame 18a (or 18b).

As explained hereinbefore, the spring 27a (or 27b) is arranged so that the adjusting lens 5a (or 5b) selectively occupies either the off-the-axis location or the on-the-axis location. In other words, the adjusting lens 5a (or 5b) is urged to either of the two locations by the tension of the spring. More specifically, let a segment between the center of the adjusting lens-supporting shaft 20a (or 20b) and that of the hole 19a (or 19b) formed in the adjusting lens frame when the adjusting lens frame occupies the off-the-axis location be called first segment; and let a segment between the center of the adjusting lens-supporting shaft 20a (or 20b) and that of the hole 19a (or 19b) formed in the adjusting lens frame when the adjusting lens frame occupies the on-the-axis location be called second segment. The fixing hole 28a (or 28b) is formed at a point in the middle of the area defined by the first and second segments. When the adjusting lens frame 18a (or 18b) turns within the limited range and the hole 19a (or 19b) formed in the adjusting lens frame goes beyond a border, which is the segment between the center of the adjusting lens-supporting shaft 20a (or 20b) and that of the fixing hole 28a (or 28b), to the side of the off-the-axis location, the tension of the spring 27a (or 27b) produces a moment to turn the adjusting lens frame 18a (or 18b) around the adjusting lens-supporting shaft 20a (or 20b) to the off-the-axis location, or in the counterclockwise direction in the figures. On the other hand, when the hole 19a (or 19b) formed in the adjusting lens frame 18a (or 18b) goes beyond the border to the side of the on-the-axis location, the tension of the spring 27a (or 27b) produces a moment to turn the adjusting lens frame 18a (or 18b) around the adjusting lens-supporting shaft 20a (or 20b) to the on-the-axis location, or in the clockwise direction in the figures. These actions urge the adjusting lens 5a (or 5b) and the adjusting lens frame 18a (or 18b) to either the off-the-axis location or the on-the-axis location selectively.

<Details of Interlocking Mechanisms>

Each adjusting lens-supporting mechanism is interlocked with the corresponding magnification-varying mechanism in these binoculars. We are going to explain an example structure of the interlocking mechanisms. Each of the interlocking mechanisms is mainly composed of a protrusion 16a (or 16b) projecting from the objective-lens-side end face of the cam tube 14a (or 14b) and extending along the axis, and a hook formed in one side face of the adjusting lens frame 18a (or 18b) so that the hook engages with the protrusion.

The protrusion 16a (or 16b) and the hook keep the adjusting lens frame 18a (or 18b) at the off-the-axis location against the tension of the spring 27a (or 27b), when the rotating tube 21a (or 21b) and the cam tube 14a (or 14b) are at the positions where the binoculars provide the minimum magnification as shown in FIG. 5. On the other hand, the protrusion and the hook keep the adjusting lens frame 18a (or 18b) at the on-the-axis location, when the rotating tube and the cam tube are at the positions where the binoculars provide the maximum magnification as shown in FIG. 6. When the magnification is decreased through an operation of the magnification-varying mechanism from the state where the adjusting lens frame 18a (or 18b) is held at the on-the-axis location, the cam tube 14a (or 14b) rotates so that the adjusting lens frame 18a (or 18b) turns toward the off-the-axis location, Once the turning is enough to move the hole 19a (or 19b) beyond the border, the adjusting lens frame 18a (or 18b) is quickly urged to the off-the-axis location by the tension of the spring 27a (or 27b). On the other hand, when the magnification is increased through an operation of the magnification-varying mechanism from the state where the adjusting lens frame 18a (or 18b) is held at the off-the-axis location, the cam tube 14a (or 14b) rotates so that the adjusting lens frame 18a (or 18b) turns toward the on-the-axis location. Once the turning is enough to move the hole 19a (or 19b) beyond the border, the adjusting lens frame 18a (or 18b) is quickly urged to the on-the-axis location by the tension of the spring 27a (or 27b). Thus, the interlocking of the adjusting lens-supporting mechanism with the magnification-varying mechanism realizes the selective positioning of the adjusting lens 5a (or 5b); the adjusting lens is at the on-the-axis location when the binoculars provide a high magnification, while it is at the off-the-axis location when a low magnification.

<Advantages of the Example>

The example that we have just explained has the following advantages in addition to the advantages that we explained hereinbefore.

A first additional advantage is that the placement of the adjusting lenses 5a, 5b on the optical axes is capable of being done with high precision and the changing of the locations can be done quickly. Since this example employs the arrangement in which the adjusting lens frames 18a, 18b turn around the respective adjusting lens-supporting shafts 20a, 20b that are disposed parallel with the corresponding optical axes, the arrangement is capable of avoiding the interference of the optical axes of the adjusting lenses 5a, 5b in the paths of light beams between the objective lenses and the eyepieces, and accurately meeting those of the adjusting lenses with the optical axes between the objective lenses and the eyepieces. Also, the adjusting lens frames 18a, 18b that are rotatably supported are urged to the on-the-axis locations or the off-the-axis locations by the springs, which makes the structure for moving the adjusting lens frames simple and which enables the user to move the adjusting lenses quickly.

A second additional advantage is that the example makes it possible to simplify the structure of the interlocking mechanism for transmitting the operation of the magnification-varying mechanism to the adjusting lens 5a (or 5b) and to ensure that the interlocking mechanism will work exactly. More specifically, this example employs the arrangement where an operation of the rotating tube 21a (or 21b) causes the focal length-varying lens 4a (or 4b) to move along the optical axis and a rotation of the rotating tube 21a (or 21b) also turns the adjusting lens frame 18a (or 18b). The transmission of motions is done between the rotating motions in this arrangement, which avoids using complicated structures for the interlocking mechanism and realizes exact actions of the involved elements.

A third additional advantage is that this example provides high magnification and enables the user to change magnification quickly. More specifically, a concave lens is employed as the adjusting lenses in this example, which lengthens the focal length of the objective lenses 7a, 7b where the binoculars provide high magnification. Compared with conventional zoom binoculars which provide high magnification only by moving lenses, the arrangement of the example is capable of decreasing the number of lenses in the entire optical systems and reducing distances which the lenses move, which provides good optical properties even at high magnification. Also, the employment of the adjusting lenses 5a, 5b makes quicker a change from a low magnification to a high magnification.

A fourth additional advantage is that the binoculars of the example are more useful than conventional zoom binoculars while the cost of their production and the weight thereof are reduced, as we mentioned hereinbefore. Specifically, the binoculars of this example are capable of achieving high magnification while the magnification-varying systems thereof use a smaller number of lenses. In addition, the magnification-varying mechanism is capable of being simplified. Therefore the weight as well as the production cost can be reduced. In particular, the reduction in the weight greatly contributes to improvement in practicality, because binoculars are often held by hands when they are used. Conventionally, almost all of the available zoom binoculars were small and expensive. The zoom binoculars of the example make it possible to lower the price of zoom binoculars or increase the size, especially the objective aperture thereof.

The present invention is applied to binoculars in the example hereinabove. Needless to say, however, the invention can be applied also to monocular optical instruments, such as telescopes and field spotting scopes, as well as binoculars.

Also, concave lenses as the adjusting lens are inserted into the optical paths in the binoculars of the example when the magnification is high. However, which lenses are used as the adjusting lens and in which range of magnification the adjusting lens is inserted can be selected at the manufacture's discretion. In other words, the magnification-varying system can be optimized in view of a wide spectrum of purposes and uses according to the present invention.

EXPLANATION OF REFERENCE NUMERALS

1 . . . central bridge of a pair of binoculars; 2a right barrel (in the state where the magnification is low); 2b . . . left barrel (in the state where the magnification is high); 3a, 3b . . . eyepiece; 4a, 4b . . . focal length-varying lens; 5a, 5b . . . adjusting lens; 6a, 6b . . . prism; 7a, 7b . . . objective lens; 8a, 8b . . . ocular tube; 9a, 9b . . . lateral hole formed in the ocular tube; 10a, 10b . . . longitudinal hole in the ocular tube; 11a, 11b . . . eyepiece frame; 12a, 12b . . . focal length-varying lens frame; 13a, 13b . . . focal length-varying lens frame-guiding pin; 14a, 14b . . . cam tube; 15a, 15b . . . cam hole; 16a, 16b . . . protrusion; 17a, 17b . . . cam tube-guiding pin; 18a, 18b . . . adjusting lens frame; 19a, 19b . . . hole formed in the adjusting lens frame; 20a, 20b . . . adjusting lens-supporting shaft; 21a, 21b . . . rotating tube; 22a, 22b . . . inner longitudinal groove; 24a, 24b . . . planar belt guide; 25 . . . planar belt; 26a, 26b click of the planar belt; 27a, 27b . . . spring; 28a, 28b . . . fixing hole for the spring.

What is claimed is:

1. A magnification-varying optical device comprising an objective lens, an eyepiece, and a focal length-varying lens placed between the objective lens and the eyepiece on an optical axis passing through the objective lens and the eyepiece, the focal length-varying lens capable of moving along the optical axis, the device further comprising:
    an adjusting lens for adjusting optical properties when the focal length-varying lens is in an area to provide a magnification within a predetermined range;
    an adjusting lens-supporting mechanism for moving the adjusting lens between a first location on the optical axis and a second location off the optical axis, and for non-movably holding the adjusting lens at either of the first location and the second location;
    a magnification-varying mechanism for adjusting a position of the focal length-varying lens; and
    an interlocking mechanism for interlocking the adjusting lens-supporting mechanism with the magnification-varying mechanism, wherein the interlocking mechanism moves the adjusting lens-supporting mechanism so that the adjusting lens is on the optical axis when the focal length-varying lens is in the area to provide a magnification within the predetermined range, and the adjusting lens is off the optical axis when the focal length-varying lens is in an area to provide a magnification outside the predetermined range.

2. The magnification-varying optical device according to claim 1, wherein the adjusting lens-supporting mechanism comprises:
    an adjusting lens-supporting shaft disposed parallel with the optical axis and at a location that does not interfere with an optical path;
    an adjusting lens frame for holding the adjusting lens, the adjusting lens frame being supported by the adjusting lens-supporting shaft so as to be capable of turning around the adjusting lens-supporting shaft, whereby the adjusting lens is turned to the first location or the second location; and
    a spring for applying force to the adjusting lens frame so as to urge the adjusting lens frame to the first location or the second location.

3. The magnification-varying optical device according to claim 2, wherein
    the magnification-varying mechanism comprises a rotating tube rotatable around the eyepiece and non-movable along an axis thereof, and a cam system for converting rotational motion of the rotating tube to linear motion and for transmitting the linear motion to the focal length-varying lens; and
    the interlocking mechanism is configured so as to move the adjusting lens frame to the first location or the second location depending on the rotating direction of the rotating tube.

4. The magnification-varying optical device according to claim 1, wherein the adjusting lens is a concave lens for lengthening a focal length of the objective lens, and the interlocking mechanism is configured so as to place the adjusting lens on the optical axis only when the focal length-varying lens is in the area to provide a magnification within the predetermined range.

5. The magnification-varying optical device according to claim 2, wherein the adjusting lens is a concave lens for lengthening a focal length of the objective lens, and the interlocking mechanism is configured so as to place the adjusting lens on the optical axis only when the focal length-varying lens is in the area to provide a magnification within the predetermined range.

6. The magnification-varying optical device according to claim 3, wherein the adjusting lens is a concave lens for lengthening a focal length of the objective lens, and the interlocking mechanism is configured so as to place the adjusting lens on the optical axis only when the focal length-varying lens is in the area to provide a magnification within the predetermined range.

7. The magnification-varying optical device according to claim 1, wherein the magnification-varying optical device is applied to a pair of binoculars equipped with a pair of optical systems for the left eye and the right eye, each optical system comprising a prism inserted between the objective lens and the eyepiece.

8. The magnification-varying optical device according to claim 2, wherein the magnification-varying optical device is applied to a pair of binoculars equipped with a pair of optical systems for the left eye and the right eye, each optical system comprising a prism inserted between the objective lens and the eyepiece.

9. The magnification-varying optical device according to claim 3, wherein the magnification-varying optical device is applied to a pair of binoculars equipped with a pair of optical systems for the left eye and the right eye, each optical system comprising a prism inserted between the objective lens and the eyepiece.

10. The magnification-varying optical device according to claim 4, wherein the magnification-varying optical device is applied to a pair of binoculars equipped with a pair of optical systems for the left eye and the right eye, each optical system comprising a prism inserted between the objective lens and the eyepiece.

11. The magnification-varying optical device according to claim 5, wherein the magnification-varying optical device is applied to a pair of binoculars equipped with a pair of optical systems for the left eye and the right eye, each optical system comprising a prism inserted between the objective lens and the eyepiece.

12. The magnification-varying optical device according to claim 6, wherein the magnification-varying optical device is applied to a pair of binoculars equipped with a pair of optical systems for the left eye and the right eye, each optical system comprising a prism inserted between the objective lens and the eyepiece.

13. A magnification-varying optical device comprising a body having an objective lens and an eyepiece spaced from the objective lens on an optical axis passing through the objective lens and the eyepiece, the device comprising:

a focal length-varying lens on the optical axis between the objective lens and the eyepiece, the focal length-varying lens being mounted in the device for movement with respect to the eyepiece along the optical axis between a first end position at maximum magnification and a second end position at minimum magnification;

an adjusting lens selectively positionable on the optical axis between the focal length-varying lens and the objective lens, and off the optical axis;

an adjusting lens-supporting mechanism for selectively moving the adjusting lens between a first location on the optical axis and a second location off the optical axis;

a magnification-varying mechanism coupled between the focal length-varying lens and the body, the magnification-varying mechanism being configured to selectively move the focal length-varying lens along the optical axis with respect to the eyepiece; and an interlocking mechanism cooperatively functioning with the magnification-varying mechanism and the adjusting lens-supporting mechanism to enable the adjusting lens to be located on the optical axis when the focal length-varying lens provides a magnification within a predetermined range and prevents the adjusting lens to be located on the optical axis when the focal length-varying lens provides a magnification outside the predetermined range.

* * * * *